United States Patent Office 3,544,303
Patented Dec. 1, 1970

3,544,303
AROMATIC CARBOXIMIDES AS HERBICIDES
Ronald Swidler, Pasadena, and Charles A. Beasley, South Pasadena, Calif., assignors to Stanford Research Institute, Menlo Park, Calif., a corporation of California
No Drawing. Filed Apr. 3, 1968, Ser. No. 718,370
Int. Cl. A01n 9/22, 9/36
U.S. Cl. 71—94          7 Claims

ABSTRACT OF THE DISCLOSURE

Novel aromatic carboximides and compositions containing these compounds are disclosed. Aromatic carboximides which are reducible between about −0.1 to −0.9 volt and which contain cationic, anionic, or nonionic water solubilizing groups substituted via alkyl, aryl aralkyl moieties onto the imidic nitrogen exhibit phytotoxic activity. Nucleophilic or electron donating groups such as $\beta$-naphthyl, dimethoxyphenyl, naphthylamine or acridine when substituted on the imidic nitrogen directly or through an alkyl chain, result in brilliantly colored crystals exhibiting piezochromic properties.

BACKGROUND OF THE INVENTION

Field of the invention

The present invention relates to novel aromatic carboximides and more particularly to N-substituted compounds exhibiting phytotoxic activity and brilliant color in the solid state.

Description of the prior art

In the course of screening a variety of compounds for possible use as growth regulators, it was discovered that certain aromatic carboximides exhibited the property of phytotoxicity toward certain plants when used according to a standard test procedure.

A number of derivatives were prepared and tested, and certain physical properties were examined in order to further classify those compounds having herbicidal properties.

Polarographic examination revealed that the most effective compounds undergo a reversible one-electron reduction in the range 0.3 to 0.7 bolt, and that compounds which are reduced outside the range 0.1 to 0.9 volt have no activity. Further reduction of the compound should occur at a potential of preferably at least 0.2 volt above the first stage of reduction. This type of electronic behavior is reminiscent of the bis-pyridinium compositions such as Diquat and the herbicidal activity of the two types of compounds may arise from a similar mode of action. The compounds must be water soluble so as to be effectively transported into the system of the plant.

Substitution of the imidic nitrogen atom of these aromatic carboximides by certain groups, in a way that does not ordinarily cause auxochromic activity, produces brilliantly colored compounds in the present instance. The auxochromic activity is believed to occur by formation of a charge transfer complex. The observation that solutions of these highly colored solids are colorless can be attributed to formation of charge transfer complexes. These compounds also exhibit the property of piezochromism.

OBJECTS AND SUMMARY OF THE INVENTION

It is therefore an object of the invention to provide a new class of herbicidal compounds that are readily synthesized from available materials and that are formulated into compositions of high and selective activity.

A further object of the invention is to provide herbicides having the desired solubility and transport properties.

Yet another object of the invention is the provision of novel water soluble herbicidal compounds exhibiting selective activity against broad leaf plants.

Another object is to provide highly colored crystalline dyestuffs based on aromatic carboximides.

These objects and many other attendant advantages of the invention will become readily apparent as the description proceeds.

The compounds of the invention are selected from those of the Formula $Ar(X)_n$ where Ar is an aromatic nucleus which can be a fused ring polycyclic aromatic hydrocarbon nucleus containing two or more carbon atoms shared in common by two or more aromatic fused rings in a closed conjugated system. X is a carboximido moiety of the formula —CO—NRZ—CO— where R is aryl, lower alkaryl or $(-CH_2-)_m$, where $m$ is an integer from 0 to 10, preferably 0–5 and $n$ is an integer from 2 to 4. Z is an aqueous solubilizing moiety selected from the group consisting of cationic, anionic, nonionic radicals or a nucleophilic group or electron donating group.

As examples of suitable parent ring systems, Ar may be selected from benzene, naphthalene, anthracene, phenanthrene, indene, fluorene, 2,3-benzanthracene, 1,2-benzophenanthrene, pyrene, pentacene, 1,2:5,6-dibenzanthracene, picene, perylene, coronene and dinaphthocoronene.

The substituted carboximdo group, X, may be on the same or different rings of the parent ring hydrocarbon. For example, the carboximide of the invention may be a derivative of pyromellitic dianhydride or of 1,4:5,8-naphthalene tetracarboxylic acid. Other anhydrides readily available according to the invention are mellitic anhydride, and perylene tetracarboxylic dianhydride.

The aromatic carboximides of the invention are rendered water soluble by substitution of the carboximido hydrogen with various cationic, anionic and nonionic aqueous solubilizing groups. For example, the solubilizing moiety of the given formula may be —RZ where R is aromatic or lower aliphatic of 1 to 10 carbon atoms, preferably alkyl of 1 to 5 carbon atoms, and Z is an anionic group such as carboxyl, phosphonyl, phosphinyl, sulfonyl or sulfinyl. Solubility is also achieved by the N-substitution of cationic groups of the formula RW where W is selected from the group consisting of phosphonium, sulphonium and quaternary nitrogen. Nonionic solubilizers can be of the formula RV where V is selected from aqueous solubilizing homopolymers of ethylene glycol and co-polymers of ethylene glycol and ethylene oxide and/or propylene oxide. Exemplary RZ solubilizing moieties are listed in the following table:

Table I

| | | |
|---|---|---|
| (1) Carboxyalkyl | ---------- | $-(CH_2)_m COOH$. |
| (2) Sulfoalkyl | ------------ | $-(CH_2)_m SO_3H$. |
| (3) Quaternary amino alkyl | --- | $-(CH_2)_m N^+R'_3$. |
| (4) Quaternary amino aryl | ----. | |
| (5) Phosphono alkyl | -------- | $-(CH_2)_m-PO(OH)_2$. |
| (6) Phosphinyl alkyl | -------- | $-(CH_2)_m POH_2$. |
| (7) Phosphonium alkyl | ------ | $-(CH_2)_m-P^+(R')_3$. |
| (8) Sulfonium alkyl | -------- | $-(CH_2)_m S^+=(R')_2$. |
| (9) Sulfinyl alkyl | ---------- | $-(CH_2)_m-SO_2H$. |

R' can be alkyl, aryl or aralkyl and is preferably lower alkyl of 1 to 3 carbon atoms, phenyl or benzyl.

The carboximides of the invention can be prepared in several ways. In a first synthesis starting with the carboximide in its hydrogen form, the solubilizing or nucleophilic moiety Z is added by an N-alkylation reaction. For example, the diimide of pyromellitic acid is converted to a soluble dicarboxyl form by the reaction of the imide with 2-carboxyethylene chloride to form the symmetrical carboxyethyl imide. The same product could be formed from the precursor anhydride by reaction of pyromellitic dianhydride (PMDA) with a suitably substituted amine. For example, PMDA, when reacted with 2-carboxyethyleneamine, forms di-carboxyethylimide. A similar procedure is utilized to form the cationic derivatives. The reaction of an aminoalkyl substituted tertiary amine with the anhydride results in a tertiary aminoalkyl imide. This compound is then converted to the quaternary form with suitable quaternizing reagents such as sodium methyl sulfate. An anionic substituted compound is formed in a similar procedure by reaction of the anhydride with a sodium sulfono-alkylamine and a nonionic derivative could be formed from an amino terminated glycol derivative.

The invention is now illustrated, but not limited by the following description of detailed examples.

DESCRIPTION OF THE PREFERRED EMBODIMENTS

Example I

An excess (0.35 mole) of β-alanine was added to 0.1 mole of mellitic anhydride in glacial acetic acid and the mixture was boiled at reflux for 2 hours. The resultant compound was washed and filtered and was analyzed as the tri-N-2-carboxy-ethyl imide of mellitic acid of the formula:

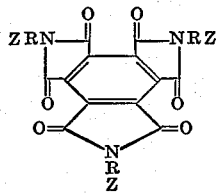

where RZ is —$CH_2CH_2COOH$.

Example II

An excess (0.25 mole) of glycine was reacted with 0.1 0.1 mole of pyromellitic dianhydride (PMDA) in glacial acetic acid and boiled at reflux for two hours. The resultant compound was separated by filtration and washed. On an analysis, the compound was identified as di-N-2-carboxyethyl pyromellitimide of the formula:

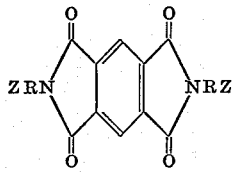

where RZ is —$CH_2CH_2COOH$.

Example III

An excess (0.25 mole) of glycine was reacted with 0.1 mole of PMDA in glacial acetic acid by boiling the mixture for two hours at reflux. The resultant compound was separated and washed and was analyzed as di-N-carboxymethyl pyromellitimide of the formula of Example II where RZ is —$CH_2COOH$.

Example IV 0.25 moles of β-alanine were reacted with 0.1 mole of 1,4:5,8-naphthalenetetracarboxylic dianhydride in water with reflux for two hours to form a residue which was filtered, washed and identified as di-N-2-carboxyethyl-1,4:5,8-naphthalene-tetracarboxylic imide of the formula:

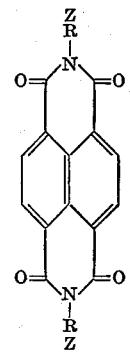

where RZ=—$CH_2CH_2COOH$.

EXAMPLE V 0.15 mole of N,N-dimethylethylene diamine was reacted with 0.1 mole of 1,8-naphthalic acid to form N-dimethyl amino ethyl napthalimide which was filtered and washed. The imide was quaternized with an excess of sodium methyl sulfate to form a compound of the formula:

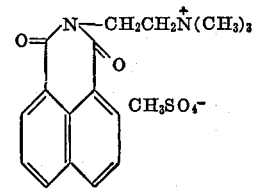

EXAMPLE VI

The reaction of Example IV was repeated by substituting 2-amino pyridine as the imidification reagent and the imide was reacted with sodium methyl sulfate to form a compound of the given formula where RZ is

EXAMPLE VII

The reaction of Example IV was repeated using N,N-dimethyl ethylene diamine as the imidification reagent and the separated and washed imide was reacted with sodium methyl sulfate to form a compound of the given formula where RZ is —$CH_2CH_2$—$N^+(CH_3)_3$.

EXAMPLE VIII

The reaction of Example II was rerun by substituting an equal molar amount of N,N-dimethyl ethylene diamine in the imidification reaction and the imide was reacted with sodium methyl sulfate to form a compound of the given formula where RZ is —$CH_2CH_2N^+(CH_3)_3$.

EXAMPLE IX 0.25 mole of 2-amino ethyl sulfonic acid was reacted with 0.1 mole of 1,16:8,9 perylene tetracarboxylic anhydride in water with reflux for two hours to form a compound of the formula:

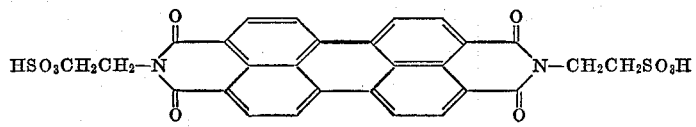

The corresponding sulfo-propyl compound was synthesized utilizing 3-amino propyl sulfonic acid.

The herbicidal activity of the compounds of Examples I to VIII was determined by formulating herbicidal compositions for topical application to plants. The compositions contained a surfactant such as 0.05% of Tween 20, a polyoxyethylene derivative of fatty acid esters, and an effective amount of the compound dissolved in water. The compounds of Examples I to IV are acids and were titrated with 1 molar triethanolamine (149 g./l. $H_2O$) to a pH of about 7.4. The remaining compounds are soluble in water. 100(C), 1,000(B) and 10,000(A) p.p.m. solutions were prepared of each of these compounds. Similarly concentrated solutions of Diquat dibromide monohydrate were prepared. Five plants of each species per treatment were totally sprayed until runoff and after 10 days, fresh weight data was collected. The average weight ($X^-$) of each of the five plant treatments for beans, corn and peas is collected in the following table in which Entries 1 to 8 relate to the compounds of Examples I to VIII. Entry 9 relates to Diquat dibromide monohydrate and Entry 10 to control.

volt. The activity is only present with closed ring dicarboximides. When the ring is fractured and the compounds are hydrolyzed to the free acid, they are non-toxic.

The substituted water soluble dicarboximides of the invention further exhibit selectivity between Dicotyledenous plants (broad leaf) and Monocotyledenous plants (grasses). The compounds have been found totally innocuous to Monocotyledenous plants while exhibiting varying degrees of phytotoxic activity on the Dycotyledenous plants. As demonstrated in Table II, beans and peas are killed while corn is not affected. Among other Dicotyledenous plants, plantain (*Plantago major*) exhibits some susceptibility; *Rumax crispus* and cotton, an intermediate susceptibility; while Kenaf and soybeans are susceptible.

The compounds exhibiting the strongest phytotoxic activity are reducible within the range of about −0.3 to about −0.7 volt. The less phytotoxic compounds can be rendered more active by modification of the nucleus. With aryl nuclear substitution of activating groups such as nitro, cyano, nitroso and acyl, the compound will be driven to reduction at a lower range of voltage. With substitution

TABLE II

| | | Beans | | | | | | Corn | | | | | | Peas | | | | | |
|---|---|---|---|---|---|---|---|---|---|---|---|---|---|---|---|---|---|---|---|
| | | 1 | 2 | 3 | 4 | 5 | Σ | $X^-$ | 1 | 2 | 3 | 4 | 5 | Σ | $X^-$ | 1 | 2 | 3 | 4 | 5 | Σ | $X^-$ |
| 1 | A | 5.3 | 5.3 | 5.3 | 4.2 | 5.4 | 25.5 | 5.10 | 4.5 | 6.7 | 4.0 | 4.8 | 4.6 | 24.6 | 4.92 | 4.1 | 3.3 | 4.4 | 2.1 | 2.2 | 16.1 | 3.22 |
| | B | 6.9 | 7.1 | 4.8 | 5.8 | 6.1 | 30.7 | 6.14 | 5.7 | 4.9 | 4.2 | 4.7 | 4.5 | 24.0 | 4.80 | 4.7 | 3.9 | 1.8 | 3.0 | 5.2 | 18.6 | 3.72 |
| | C | 6.7 | 7.1 | 6.3 | 6.1 | 7.8 | 34.0 | 6.80 | 3.5 | 3.6 | 4.0 | 3.5 | 3.9 | 18.5 | 3.70 | 2.3 | 4.1 | 4.6 | 3.9 | 2.5 | 17.4 | 3.48 |
| 2 | A | 1.2 | 5.5 | 7.1 | 5.1 | 7.3 | 26.2 | 5.24 | 3.5 | 3.0 | 4.6 | 5.2 | 4.0 | 20.3 | 4.06 | 3.4 | 2.2 | 2.6 | 3.3 | 3.4 | 14.9 | 2.98 |
| | B | 4.7 | 5.1 | 5.8 | 6.7 | 6.5 | 28.8 | 5.76 | 4.0 | 2.7 | 4.1 | 4.1 | 4.7 | 19.6 | 3.92 | 3.5 | 4.4 | 3.5 | 3.2 | 3.9 | 18.5 | 3.70 |
| | C | 7.0 | 7.7 | 7.4 | 6.2 | 5.2 | 33.5 | 6.70 | 4.7 | 5.0 | 4.4 | 2.7 | 5.1 | 21.9 | 4.38 | 3.4 | 3.9 | 3.8 | 4.4 | 2.5 | 18.0 | 3.60 |
| 3 | A | 4.2 | 4.6 | 4.0 | 5.7 | 4.7 | 23.2 | 4.64 | 3.4 | 2.9 | 2.9 | 2.9 | 2.3 | 14.4 | 2.88 | 2.9 | 2.7 | 3.5 | 3.6 | 3.6 | 16.3 | 3.26 |
| | B | 6.2 | 7.0 | 5.9 | 5.2 | 4.9 | 29.2 | 5.84 | 2.5 | 2.1 | 3.0 | 4.2 | 2.7 | 14.5 | 2.90 | 2.7 | 2.3 | 4.5 | 3.7 | 4.3 | 17.5 | 3.50 |
| | C | 10.6 | 6.9 | 5.3 | 6.1 | 6.5 | 34.5 | 6.90 | 4.0 | 3.8 | 5.7 | 4.7 | 2.9 | 21.1 | 4.22 | 4.4 | 3.6 | 4.2 | 4.0 | 3.7 | 19.9 | 3.98 |
| 4 | A | 4.0 | 5.2 | 5.8 | 5.4 | 3.7 | 24.1 | 4.82 | 0.8 | 1.9 | 2.4 | 1.9 | 2.2 | 9.2 | 1.84 | 2.3 | 2.7 | 3.0 | 2.6 | 1.8 | 12.4 | 2.48 |
| | B | 7.1 | 7.2 | 6.0 | 4.6 | 5.3 | 30.2 | 6.04 | 2.4 | 1.3 | 3.9 | 2.8 | 3.3 | 13.7 | 2.74 | 3.9 | 3.1 | 3.5 | 3.8 | 2.8 | 17.1 | 3.42 |
| | C | 6.0 | 6.6 | 6.4 | 5.8 | 6.5 | 31.3 | 6.26 | 4.0 | 6.2 | 6.5 | 3.5 | 3.8 | 24.0 | 4.80 | 4.3 | 4.2 | 5.2 | 5.1 | 4.2 | 23.0 | 4.60 |
| 5 | A | 7.2 | 5.5 | 4.8 | 5.9 | 5.1 | 28.5 | 5.70 | 3.5 | 3.7 | 4.7 | 4.9 | 4.4 | 21.2 | 4.24 | 2.4 | 2.0 | 3.1 | 2.4 | 4.2 | 14.1 | 2.82 |
| | B | 6.1 | 7.9 | 5.1 | 5.4 | 5.8 | 30.3 | 6.06 | 3.8 | 3.1 | 3.7 | 5.1 | 5.6 | 21.3 | 4.26 | 4.7 | 4.5 | 3.2 | 4.6 | 3.7 | 20.7 | 4.14 |
| | C | 3.1 | 8.9 | 4.4 | 7.3 | 5.8 | 29.5 | 5.90 | 5.2 | 5.6 | 5.4 | 3.0 | 3.5 | 22.7 | 4.54 | 4.9 | 4.0 | 4.8 | 3.5 | 3.6 | 20.8 | 4.16 |
| 6 | A | 3.1 | 2.5 | 1.5 | 3.6 | 2.8 | 13.5 | 2.70 | 2.2 | 3.5 | 4.1 | 4.2 | 3.6 | 17.6 | 3.52 | 2.8 | 2.2 | 2.5 | 2.5 | 2.4 | 12.4 | 2.48 |
| | B | 5.8 | 3.5 | 5.5 | 3.1 | 3.5 | 21.4 | 4.28 | 2.9 | 5.1 | 3.6 | 4.8 | 4.4 | 20.8 | 4.16 | 2.9 | 2.6 | 6.3 | 2.6 | 3.0 | 14.4 | 2.88 |
| | C | 3.5 | 7.9 | 9.3 | 6.1 | 5.3 | 32.1 | 6.42 | 5.9 | 3.6 | 3.5 | 5.1 | 1.7 | 19.8 | 3.96 | 4.8 | 2.2 | 4.3 | 3.6 | 3.6 | 18.5 | 3.70 |
| 7 | A | 1.5 | 1.6 | 1.4 | 0.9 | 1.0 | 6.4 | 1.28 | 3.6 | 3.2 | 3.6 | 4.8 | 3.4 | 18.6 | 3.72 | 2.5 | 2.7 | 2.7 | 2.3 | 2.0 | 12.2 | 2.44 |
| | B | 1.9 | 3.4 | 3.1 | 2.6 | 3.3 | 14.3 | 2.86 | 4.2 | 5.3 | 5.2 | 3.8 | 2.4 | 20.9 | 4.18 | 2.7 | 2.6 | 2.5 | 2.4 | 2.4 | 12.1 | 2.42 |
| | C | 4.3 | 3.1 | 4.6 | 3.8 | 4.4 | 20.2 | 4.04 | 4.8 | 4.5 | 3.3 | 4.2 | 4.3 | 21.1 | 4.22 | 2.7 | 3.0 | 2.6 | 2.9 | 2.7 | 13.9 | 2.78 |
| 8 | A | 8.1 | 3.6 | 7.4 | 5.1 | 5.9 | 30.1 | 6.02 | 3.1 | 3.4 | 4.7 | 1.7 | 6.2 | 19.1 | 3.82 | 2.8 | 3.4 | 3.7 | 3.6 | 1.9 | 15.4 | 3.08 |
| | B | 8.0 | 7.1 | 9.0 | 6.7 | 4.3 | 35.3 | 7.06 | 5.8 | 5.2 | 2.9 | 4.3 | 3.4 | 21.6 | 4.32 | 2.9 | 3.6 | 3.8 | 2.8 | 3.9 | 17.0 | 3.40 |
| | C | 7.0 | 9.5 | 5.8 | 5.4 | 8.3 | 36.0 | 7.20 | 5.4 | 3.6 | 3.0 | 3.8 | 5.4 | 21.2 | 4.24 | 4.6 | 4.1 | 4.5 | 3.7 | 3.1 | 20.0 | 4.00 |
| 9 | A | 1.4 | 1.2 | 0.9 | 0.6 | 0.6 | 4.7 | 0.94 | 1.1 | 1.1 | 2.0 | 0.7 | 0.9 | 5.8 | 1.16 | 2.5 | 2.0 | 2.1 | 2.4 | 2.4 | 11.4 | 2.28 |
| | B | 1.5 | 1.6 | 1.5 | 0.9 | 1.3 | 6.8 | 1.36 | 1.2 | 1.2 | 0.8 | 1.5 | 0.8 | 5.5 | 1.10 | 3.5 | 2.7 | 2.1 | 1.2 | 2.2 | 11.7 | 2.34 |
| | C | 2.6 | 3.2 | 2.7 | 2.6 | 1.2 | 12.3 | 2.46 | 1.4 | 2.2 | 2.1 | 1.8 | 1.2 | 8.7 | 1.74 | 3.1 | 3.2 | 3.0 | 2.7 | 2.0 | 14.0 | 2.80 |
| 10 | A | | | | | | | | | | | | | | | | | | | | | |
| | B | | | | | | | | | | | | | | | | | | | | | |
| | C | 6.6 | 7.2 | 6.7 | 7.2 | 6.5 | 34.2 | 6.84 | 5.2 | 4.6 | 4.8 | 2.7 | 6.5 | 23.8 | 4.76 | 3.7 | 4.5 | 4.0 | 4.6 | 4.8 | 21.6 | 4.32 |

Corn is representative of the grass family, while beans and peas are accepted as broad leaf test plants. It is observed from Table II that compared to the control, the compounds of Examples 1 to 3, 5 and 8 exhibited some activity at high concentration. Structurally, it is noted that these compounds contain only a single aromatic ring or a single dicarboximido group. Electronically, it is observed that the compound of Example 5 is reducible at a voltage of −0.9 volt. The compounds of Examples 2, 3 and 8 are reducible at a voltage of −0.7 volt. Perylene tetracarboxylic carboximide is reversibly reducible at −0.1 to −0.2 volt and in a separate test the sulphoethyl derivative of Example 9 was found to exhibit low activity.

However, the compounds of Examples 4, 6 and 7 which are derivatives of naphthalene tetracarboxylic acid are reducible at about −0.45 volt and exhibit the best activity and can be applied at commercial concentrations. The quaternary derivative of Example 7 closely approaches the activity of Diquat. Furthermore, these compounds exhibit a second wave of reducibility at about 0.65 of deactivating groups such as alkoxy and amino, the compound will be reducible at a high range of voltage.

Compounds, brilliantly colored in the solid crystalline state, have been discovered according to the invention. The compounds are prepared by substituting onto the imidic nitrogen of an aromatic carboximide a series of nucleophilic moieties having an electron donating capability sufficient to produce color. The nucleophilic moieties may be aryl or heterocycle or hydroxy, lower alkoxy or amino derivatives thereof.

The synthesis is similar to that disclosed with respect to the herbicidally active compounds. The imidic nitrogen may be alkylated or a precursor cyclic anhydride may be reacted with an amino alkyl derivative of the nucleophilic moiety to directly form the colored substituted imide.

A series of colored compounds were prepared by reacting an excess (0.25 mole) of an amino compound of the formula $NuRNH_2$ where Nu is the nucleophile and R is alkyl of 0 to 10 carbon atoms with 0.1 mole of 1,4:5,8-naphthalene tetracarboxylic anhydride in a polar solvent such as dimethyl formamide (DMF) or N-methyl pyrrolidone to form compounds of the formula:

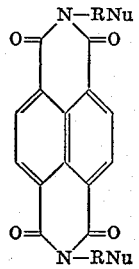

The properties of the compounds are listed in the following table:

| E | Nu | Color |
|---|---|---|
| 14 | Phenyl | Colorless. |
| 12 | β-naphthyl | Yellow. |
| 13 | 2,4-dimethoxyphenyl | Orange. |
| 14 ethylene | 2,4-dimethoxyphenyl | Red-orange. |
| 15 ethylene | Naphthylamine | Blue. |
| 16 propylene | Acridine | Maroon. |
| 17 propylene | Acridine | Orange[1]. |

[1] The compound was mechanically ground.

The compounds were colorless in solution, but brilliantly colored in the dry crystalline state. They exhibit high thermal stability and melt at temperatures above 350° C. These compounds exhibit the property of piezochromism. The compounds can be reduced with hydrosulfite to a water soluble form. The water soluble derivative can then be insolubilized by reoxidation in the presence of fibers to be dyed.

The reducible aromatic carboximido nucleus is generally believed to be electrophilic, i.e. electron seeking. It is observed that the colorless naphthalene tetracarboxylic diimide has been driven through a spectrum of colors by substitution of nucleophilic or electron donating groups and that the compounds are colored in the solid state, but colorless in solution. This effect is observed even when the nucleophilic moieties are isolated from activating or deactivating effects and reactions or conjugation with the aromatic carboximido nucleus by an alkyl group, preferably of 1 to 10 carbon atoms. In these N-alkyl substituted compounds, any activity between the electronically functional nucleus and pendant moiety must be indirect.

It is believed that the mobile Pi electrons of the nucleophile are being electronically perturbed or complexed to produce highly colored charge transfer complexes. The variance in color would then be related to the order of the ability of the Pi electrons to be polarized and the degree of action, perturbation or complexing exerted on the field of these electrons.

It is to be understood that the foregoing relates only to preferred embodiments and that numerous modifications, substitutions and alterations are permissible without departing from the scope of the invention as defined in the following claims. For example, the compounds will also find use as assistants in electroplating baths, as redox indicators and as extractants.

What is claimed is:

1. A composition for controlling the growth of plants comprising an aqueous carrier having dissolved therein a surfactant and 100 to 10,000 p.p.m. of a water soluble compound of the formula:

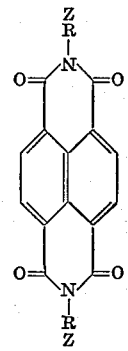

where R is lower alkyl, and Z is —N$^+$(R')$_3$. Where R' is lower alkyl of 1 to 5 carbon atoms.

2. A method of inhibiting the growth of plants comprising the step of applying to the plant an effective amount of a compound of the formula:

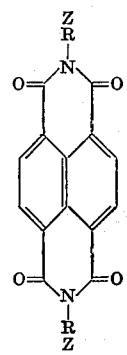

where R is lower alkyl, monocyclic hydrocarbyl aryl or hydrocarbylaryl lower alkyl and Z is an anionic, cationic or nonionic water solubilizing moiety selected from the group consisting of —N$^+$(R')$_3$, —S$^+$(R')$_2$, —P$^+$(R')$_3$ where R' is lower alkyl of 1 to 5 carbon atoms, phenyl and lower alkyl phenyl; carboxyl, phosphonyl, phosphinyl, sulfonyl, sulfinyl, homopolymers of ethylene glycol and copolymers of ethylene glycol with ethylene oxide or propylene oxide.

3. A method according to claim 2 in which an aqueous solution of about 100 to 1,000 p.p.m. of a water soluble di-imide of naphthalene tetracarboxylic acid is sprayed onto the plant until run off.

4. A method according to claim 2 in which Z is —N$^+$(R')$_3$ and R is lower alkyl.

5. A method according to claim 4 in which RZ is —CH$_2$CH$_2$—N$^+$(CH$_3$)$_3$.

6. A method according to claim 2 in which said compound is applied to Dicotyledenous plants.

7. A method according to claim 6 in which said compound is applied to a mixture of Monocotyledenous and Dicotyledenous plants and exhibits substantially greater phytotoxic activity toward the latter type of plants.

References Cited

UNITED STATES PATENTS

| 2,455,095 | 11/1948 | Scalera et al. | 260—281 |
| 2,821,467 | 1/1958 | Lawis | 71—94 |
| 2,844,628 | 7/1958 | Kuhle et al. | 71—94 |
| 2,885,320 | 5/1959 | Murray | 71—94 |
| 2,904,554 | 9/1959 | Wheeler et al. | 71—94 |
| 3,111,523 | 11/1963 | Frohardt et al. | 71—94 |
| 3,133,072 | 5/1964 | Shibe et al. | 260—281 |
| 3,156,554 | 11/1964 | Tolbert | 71—121 |
| 3,256,276 | 6/1966 | Grogan et al. | 260—281 |
| 3,407,204 | 10/1968 | Shay et al. | 260—281 |

(Other references on following page)

FOREIGN PATENTS 362,906 12/1931 Great Britain _____ 260—281
1,225,191 9/1966 Germany _____ 260—281

OTHER REFERENCES

Farbenfabriken I, "N,N'-Disubstituted naphthalene, 1,4,5,8-*t*etracarboxylic acid diimides" (1965), CA 64, p. 15,814 (1966).

Farbenfabriken II, "Basic alkylated etc." (1965), CA 65, pp. 669, 670 (1966).

Farbenfabriken III, "Naphthalene 1,4,5,8-tetracarboxylic acid diimide derivatives" (1966), CA 66, p. 37700 S. (1967).

Farbenfabriken IV, "Therapeutically useful imides of 1,4,5,8-naphthalene carboxylic acid," (1967), CA 68 p. 68786V. (1968).

LEWIS GOTTS, Primary Examiner

G. HOLLRAH, Assistant Examiner

U.S. Cl. X.R.

111—86, 95;260—279, 281, 326; 8—32, 83, 84; 106—1; 252—408